2 Sheets—Sheet 2.
J. DU BOIS.
Machine for Sawing Box-Stuff.
No. 220,062. Patented Sept. 30, 1879.
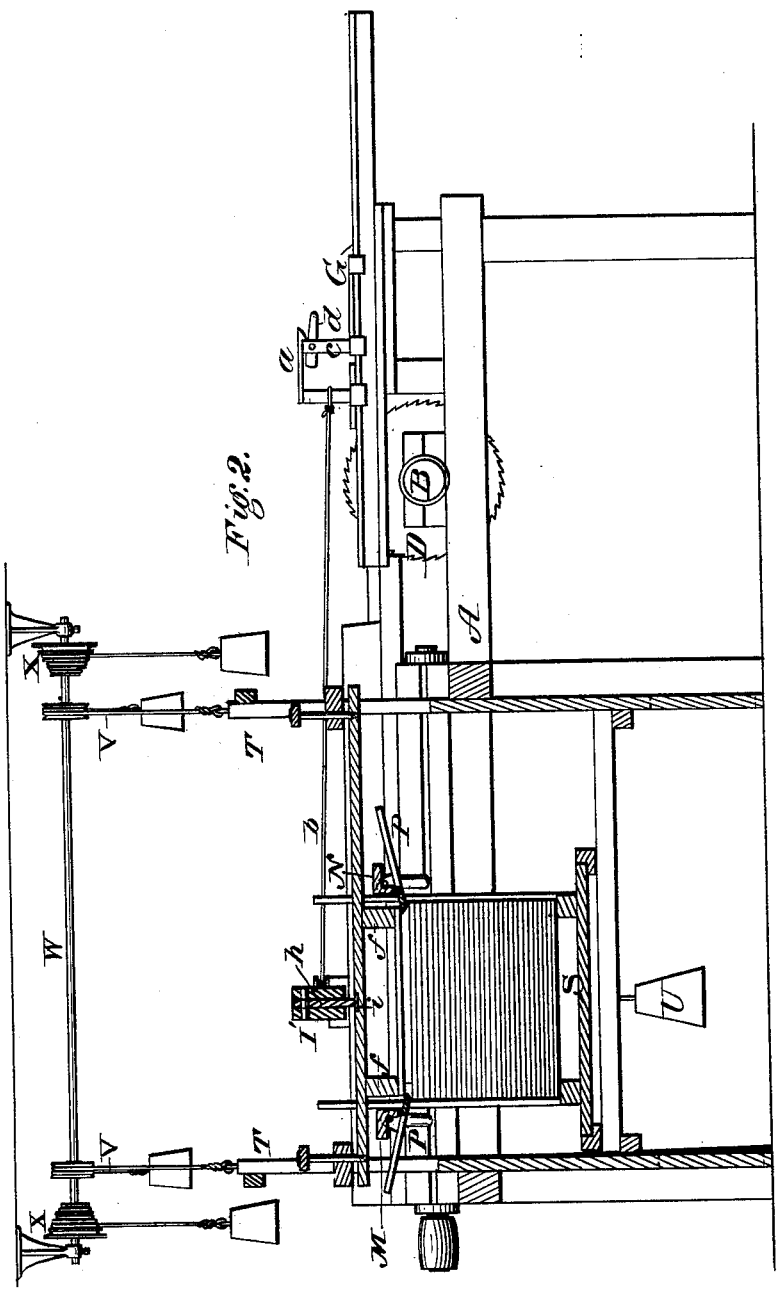
Witnesses:
Donn P. Fritchell.
Will W. Dodge
Inventor:
John Du Bois
By his atty.
Dodger Jr.

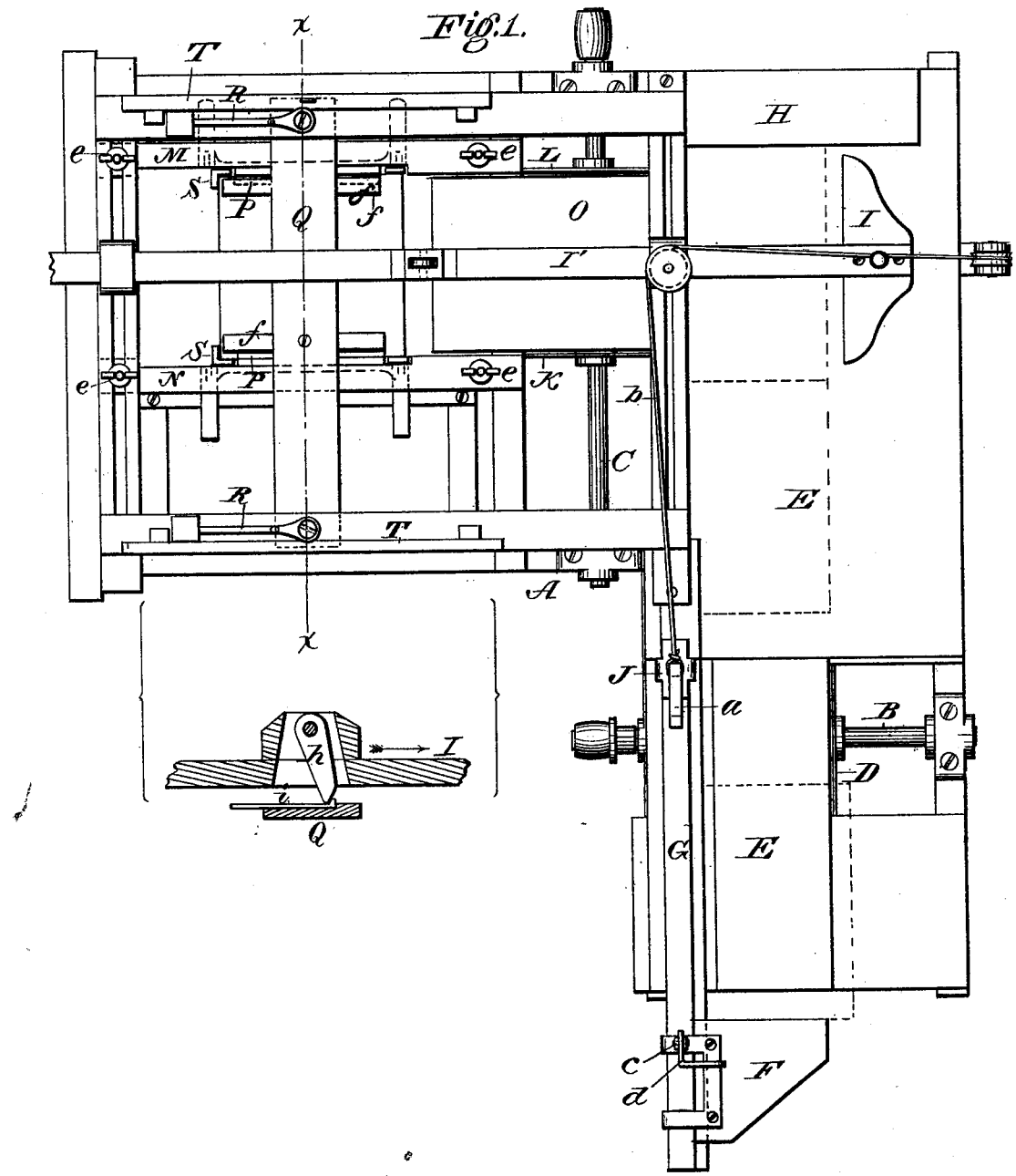

UNITED STATES PATENT OFFICE.

JOHN DU BOIS, OF WILLIAMSPORT, PENNSYLVANIA.

IMPROVEMENT IN MACHINES FOR SAWING BOX-STUFF.

Specification forming part of Letters Patent No. 220,062, dated September 30, 1879; application filed January 27, 1879.

*To all whom it may concern:*

Be it known that I, JOHN DU BOIS, of Williamsport, in the county of Lycoming and State of Pennsylvania, have invented certain Improvements in Machinery for Reducing Box-Stuff to Size, of which the following is a specification.

My invention relates to machinery for reducing box material to size, both as to length and breadth; and consists in a machine provided with two carriers or feeding devices, the first of which passes the boards between a guide and a saw, which reduces them to the required width and delivers them to the second, by which they are passed at right angles to their first advance between two saws, which square their ends and cut them to proper length.

The invention further consists in devices for piling up the finished pieces ready for tying, and in certain details of construction hereinafter described.

Figure 1 represents a top-plan view of my improved machine, and Fig. 2 a vertical cross-section on the line $x\ x$ of Fig. 1.

The machine is more especially designed for cutting box-material from pieces sawed from slabs, shingle-saps, &c., which are ordinarily wasted. The wood for this purpose is cut to about the length required, and is then either kiln-dried or weather-seasoned, as desired. The pieces are then surfaced, and, if not of sufficient width to form the part of the box for which they are designed, are matched and joined together until the desired width, and a little more, is obtained.

In this condition the boards or pieces come to the machine, which consists, primarily, of an L-shaped frame, A, in which are mounted at right angles to each other two horizontal shafts or arbors, B C, the former carrying one and the latter two saws, each adjustable longitudinally of the shafts or arbors.

The saw D, which is mounted on the shaft B, extends upward through or by the edge of a horizontal bed or table, E, upon which the pieces are placed as they come to the machine. Extending along the side of the bed or table opposite the saw is a guide or way, against which one edge of the pieces rests, and upon which slides a carrier, F, extending out over the table E and engaging behind the boards or pieces thereon. The carrier F is then shoved forward, carrying before it the board or piece between the guide G and saw D, which reduces it to the required width. As one piece is thus reduced the carrier F is withdrawn, and another piece placed before it and passed forward in like manner, each additional piece shoving forward the ones previously cut until the forward one reaches a stop or abutment, H, at the rear end of the table E. As the pieces are thus brought to the required width and advanced the forward one is carried directly in front of a second sliding carrier or head, I, which is arranged to move across the table at right angles to the incoming pieces or boards, and which is drawn back out of the way of said boards by a weight, U, connected to the carrier by a rope or chain, and passing over a pulley down by the side of the machine.

The carrier I is provided with a long guiding-bar, I′, traveling in guide-blocks, as shown.

The shaft C carries two saws, K and L, which are adjusted upon the shaft or arbor at a distance from each other exactly corresponding to the required length of the boards or pieces which are carried by the carrier I to them, the saw L being arranged a short distance in advance of the forward face of the abutment H, as shown, in order that the end of each board or piece may be passed slightly beyond the saw, and be cut off and squared thereby.

Mounted and free to slide upon the guide or way G is a block, J, provided with a horizontal spring-arm, $a$, having a hook end, and extending outward toward the carrier F, as shown in Figs. 1 and 2, said block J being connected by a cord or chain, $b$, passing around a pulley on frame A to the sliding-head or block I, as shown in Fig. 1, while the carrier F has a short upright, $c$, over which the spring-arm $a$ engages when the carrier F is moved forward slightly beyond the distance required to complete the reduction of a board or piece to the required width.

It will thus be seen that as soon as the forward board or piece of box-stuff advances against the abutment H the spring-arm $a$ engages with the upright $c$ of carrier F, when, by drawing back said carrier, the slide J is caused to move back with it, and, through the cord or chain b, to advance the head or block J, causing the latter to move the forward board or piece sidewise against the saws K L, by which it is reduced to the exact length required, and its ends are rendered square and even.

The material is not carried quite far enough by the head or carrier I to complete the cutting of its ends; but this is effected by the next succeeding piece, which not only finishes its movement past the saws, but, carrying it beyond the same, presents it to the piling or packing devices, which will be presently described.

By the above-described arrangement of sliding heads or carriers, it will be observed that the operator, after the forward piece of stuff has reached the abutment H, has only to withdraw the block F to carry forward a piece of material to the saws K and L. This being done, the spring-arm $a$ is disengaged from the upright $c$ by means of a lever or eccentric, $d$, pivoted therein, whereupon the head or block I is drawn back by the weighted cord, as previously described, ready to advance the next piece carried in front of it by the carrier F.

It will thus be seen that a simple forward and backward movement of the carrier F, accompanied by a disengagement of the spring-arm $a$ at the end of each backward movement, is all that is required to present the material properly to the different saws.

For the purpose of piling the material up in regular shape as it comes from the saws K L, I mount within the frame A two beams, M N, adjustable to or from each other to correspond with the distance between the saws K L, and clamped in position by bolts $e$. From the under side of these beams are hung weighted supporting plates or strips P, onto which the finished pieces of material move as they pass from the bed or table O between the saws K L.

Directly above the supporting-plates P are two bars or strips, $f$, secured to the under side of a bar, Q, extending across the frame of the machine, and held upward by weighted arms or levers R, pivoted or supported between their ends, the arms or bars $f$ being thus held sufficiently high to permit the boards to pass readily under them onto the plates P. When in this position on the plates or supports P the boards or pieces lie directly over a receiving-crib, S, consisting of four guide-posts secured in a vertical position to a common bed or bottom, as shown in Fig. 2, and serving to receive and guide the four corners of the boards, which are piled one above another in the crib S.

In order to discharge the boards from the plates or supports P squarely and properly into the crib S, the bar T' of the sliding block or head I is provided with a pendent tongue, $h$, extending through its lower face, and arranged to ride freely over a catch, $i$, upon the upper face of the bar Q as the head or carrier advances, but to engage therewith as the carrier or head returns, and being thereby brought to an upright position, causing the bar Q to be forced downward, pressing the bars $f$ down upon the board just delivered upon the plates P, and thereby swinging said plates downward and backward, and permitting the board to fall into the crib S. As the tongue $h$ passes off the bar Q the latter and the plates P assume their former position, ready to repeat their operation.

The crib S is slid into and out of the frame A upon suitable guides, so that when one is filled it may be readily removed and returned or replaced by another while the finished pieces in the first are being tied into a bundle. The guides or supports of the crib S are sustained upon cross-beams, in turn supported upon cleats or strips secured to vertically-sliding frames T.

In order that the boards or strips may not turn or drop out of place in falling into the crib S, the frames T are held in an elevated position by means of ropes or chains V passing upward and around pulleys on a horizontal shaft, W, hung from the ceiling or in suitable standards, as shown in Fig. 2, said ropes or chains being provided with weights, as shown. The frames T, being thus held up, cause the upright posts of the crib S to project upward past the supporting-plates P and bring the bed of the crib, or the upper board thereon, close up to the under side of the plates P, thus causing the boards to fall but a few inches, and preventing them from turning.

The weights attached to the cords or chains V are just sufficient to balance the crib S and its supporting devices, and it therefore becomes necessary to provide means for compensating for the additional weight of the boards as they fall thereon; and to this end I secure upon the shaft W one or more cone-pulleys, X, upon which wind weighted cords as the crib S descends, or is furnished with additional boards, the cords winding on the pulleys from the small end, and their weights consequently acting with increasing effect as the cords are wound upon them.

In order to insure the rotation of the shaft W, and the consequent turning of the pulleys X, the cords V are passed twice or more around their pulleys.

The saws and guides may be adjusted to regulate both the width and length of the finished pieces.

If one end of the pieces as they come to the machine is already square, the saw L may be omitted.

It is also obvious that, if neither side of the blank is true, two saws may be used on the arbor B.

Having thus described my invention, what I claim is—

1. In a machine for sizing box material, &c., the combination of two saws at right angles to each other and two carriers arranged in relation to each other and to the saws substantially as shown, so that one carrier delivers the material past the first saw to the second carrier, and that the latter delivers the material to the second saw.

2. In combination with the saws D and K, at right angles to each other, the two carriers F and I, and devices, substantially such as shown, to connect the carriers with each other, whereby one is caused to actuate the other.

3. In combination with the carriers I and F, the connecting-cord b, weight U, and slide J, provided with devices to engage automatically with the carrier F, as shown.

4. In combination with the slide J, having the hooked arm a, and the block or carrier, F, having the upright c, the lever d, for disengaging the arm from the upright, as described.

5. In combination with the saw or saws K L, yielding supports P, to sustain the boards, and automatic devices, substantially such as shown, arranged to force the boards down past the supports.

6. The combination of the saw or saws K L, supports P, and a crib or cage arranged below the latter to receive the sized boards as they fall between the supports.

7. The combination of the swinging weighted bars P, the yielding bar Q, and the reciprocating bar I', provided with the pawl or tongue h.

8. The combination of the saws K L, the former adjustable laterally, with the laterally-adjustable supports M, N, and P.

JOHN DU BOIS.

Witnesses:
WALTER S. DODGE,
WILLIAM W. DODGE.